United States Patent [19]

Dagenais

[11] E Re. 29,308

[45] Reissued July 19, 1977

[54] PROTECTIVE GRILLE

[75] Inventor: Robert Dagenais, Laval, Canada

[73] Assignee: Dynaflair Corporation Ltd., Pointe Claire, Canada

[21] Appl. No.: 691,403

[22] Filed: June 1, 1976

Related U.S. Patent Documents

Reissue of:

[64] Patent No.: 3,901,302
Issued: Aug. 26, 1975
Appl. No.: 406,896
Filed: Oct. 16, 1973

[51] Int. Cl.[2] ..... E05D 3/00; E05D 7/00

[52] U.S. Cl. ..... 160/183; 160/199; 160/229 R; 16/128 R

[58] Field of Search ..... 160/183, 199, 206, 210, 160/211, 212, 213, 229, 230; 16/128 R

[56] References Cited

U.S. PATENT DOCUMENTS

| | | | |
|---|---|---|---|
| 2,835,223 | 5/1958 | Erickson | 160/210 |
| 3,359,594 | 12/1967 | Pastoor | 160/199 |
| 3,405,756 | 10/1968 | Harris | 160/183 |
| 3,654,982 | 4/1972 | Labelle | 160/199 |

FOREIGN PATENT DOCUMENTS

| | | | |
|---|---|---|---|
| 931,987 | 7/1963 | United Kingdom | 160/183 |

*Primary Examiner*—Peter M. Caun

[57] ABSTRACT

A foldable closure structure comprising a foldable curtain having a plurality of panel members hingeably interconnected along opposed vertical edges. Detachable hinge means are secured in spaced apart relationship to each of the vertical edges of the panel members. A connecting rod interconnects the hinge means of adjacent vertical edges along a common axis. Suspension means are provided for suspending the curtain in a frame opening. The hinge means are each provided with attachment means for detachable connection to a portion of a respective vertical edge of adjacent panel members.

8 Claims, 4 Drawing Figures

PROTECTIVE GRILLE

Matter enclosed in heavy brackets [ ] appears in the original patent but forms no part of this reissue specification; matter printed in italics indicates the additions made by reissue.

BACKGROUND OF INVENTION (a) Field of the Invention

The present invention relates to a foldable closure structure having detachable hinge members for interconnecting adjacent panels and for pivotally securing the panels together.

(b) Description of Prior Art

Prior art foldable closure structures generally comprise numerous parts which are difficult to assemble and manufacture. Also, some of these structures are difficult and time-consuming to install in view of their weight and complex assembly. Still further, such structures are costly to manufacture and repair because of the great number of parts and materials used. Furthermore, known foldable closures have openings therein reducing their security aspect.

SUMMARY OF INVENTION

It is a feature of the present invention to provide an improved foldable closure structure which substantially overcomes the above-mentioned disadvantages of the prior art, thus providing a structure which is easy to manufacture, economical, easy to install and of light weight.

It is a further feature of the present invention to provide a structure having interchangeable parts and which can be assembled in various lengths without requiring special tools or pre-assembly. Thus, the structure can be easily shipped in its non-assembled form and requires very little skill for installation and repair.

According to the above features, from a broad aspect, the present invention provides a foldable closure structure comprising a foldable curtain having a plurality of panel members hingeably interconnected along opposed vertical edges. Detachable hinge means are secured in spaced apart relationship to each of the vertical edges. A connecting rod pivotably interconnects the hinge means of adjacent vertical edges along a common axis. Suspension means are also provided for suspending the curtain from a track secured above an opening.

BRIEF DESCRIPTION OF DRAWINGS

The invention will now be described with reference to the accompanying drawings in which.

DESCRIPTION OF PREFERRED EMBODIMENTS

Figure 1:
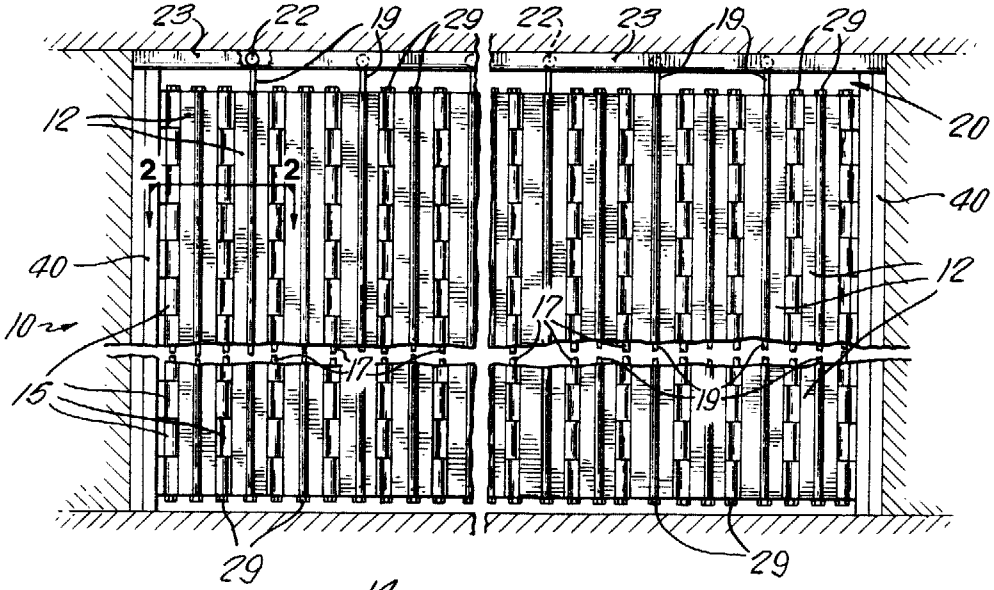
FIG. 1 is a fragmented plane view of the folding closure structure extending across an opening.

Referring now to the drawings, there is shown generally at 10, the foldable closure structure of the present invention. The structure 10 is a foldable curtain formed from a plurality of elongated rectangular panel members 12 which are interconnected along opposed vertical edges 13 by detachable hinge means 14 adapted to receive and retain the vertical edge 13 therein. The hinge means 14 consist of a plurality of hinge members 15 secured along a vertical edge of each panel member 12 and in spaced apart relationship. The spacing between the hinge members 15 is equal to the length of the hinge member to permit hinge members 15 of an adjacent panel 12 to be interposed in the spaces to provide a series of hinge members positioned in alignment for interconnecting two adjacent panels 12 together. The interconnection is made by securing a connecting rod 17 in a circular bore 18 provided in the member 15. A washer and bolt 29 is attached to each end of the rod 17 which terminates flush with the ends of the panel members 12.

The foldable curtain 10 is suspended in an opening 20 by support rods 19 which are held in a vertical through bore 21 extending vertically along the panel member 12. The support rod 19 is provided with a connectable end 22 which is adapted to be received in a ceiling track 23 for slidable engagement therewith whereby to permit the panel members 12 of the curtain 10 to be foldable in an accordion fashion. As shown in FIG. 1, a support rod 19 is provided in every second panel member 12.

As shown more clearly in FIG. 2, each hinge member 15 is provided with a cylindrical bore 18 for receiving the connecting rod 17 therein as mentioned hereinabove. A further through bore 25 is disposed parallel to the circular bore 18 and provides the attachment means. A panel receiving opening 26 is formed in each member 15 and extends to the attachment through bore 25 whereby to permit the vertical end edge 13 of a panel member 12 to be slid into the attachment bore. Thus, the panel member 12 extends out of the panel receiving opening 26 and the hinge is secured to the panel by merely sliding it over the vertical edge of the panel from the end thereof. Each hinge member 15 is also provided with an abutment surface 27, herein a concave surface, extending parallel to the through bore 25 for abutment with a portion of the vertical edge 13 of the panel member 12 adjacent to the panel member to which the hinge member is connected to.

Figure 2:
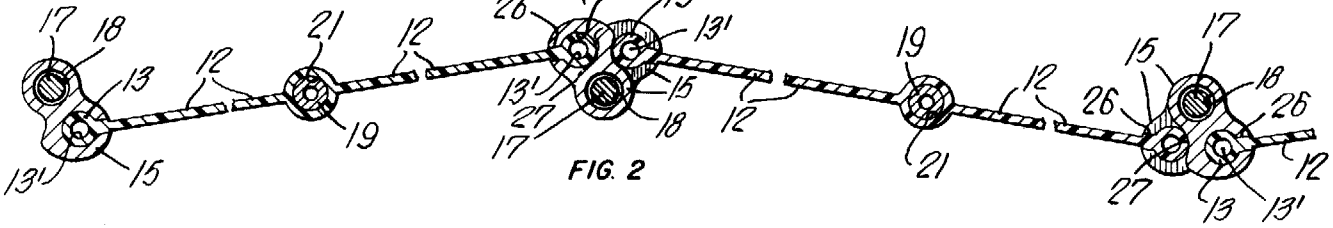
FIG. 2 is a fragmented sectional view through a portion of the curtain.

As shown in FIG. 2, when the curtain panel members 12 are fully extended, the end edges 13 are in abutment with the surface 27. In its fully extended position, the panels 12 extend in an expanded accordion fashion with the panels traversing the central longitudinal axis of the curtain at an angle of approximately 10°.

Figure 3:
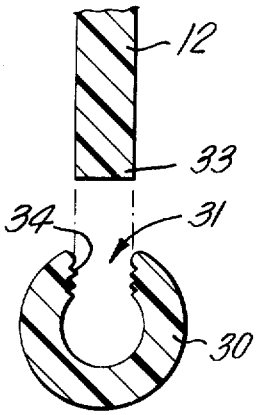
FIG. 3 is a fragmented sectional end view of a further embodiment of a panel end edge.
Figure 4:
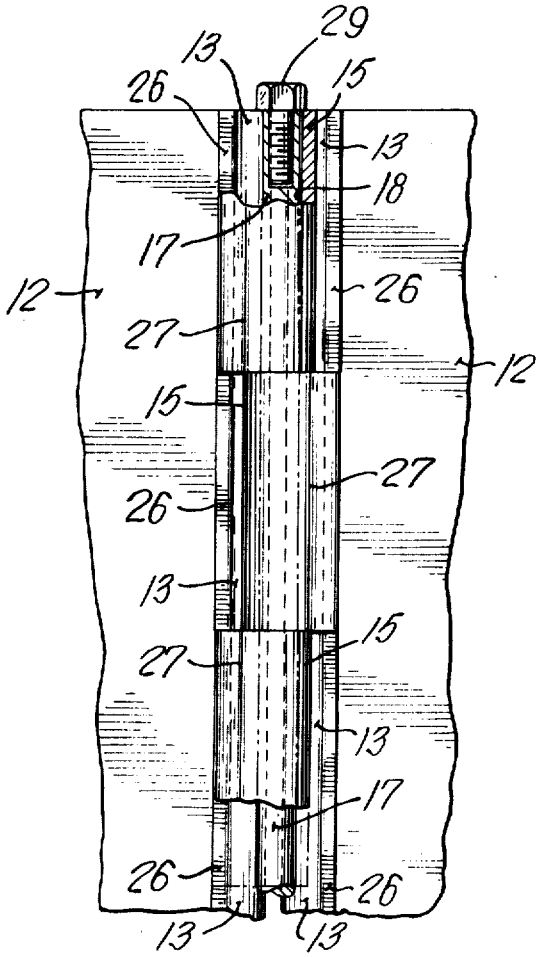
FIG. 4 is an enlarged fragmented view of the hinge members.

As shown, the vertical end edges 13 of the panel members 12 are enlarged and hereinshown as being tubular edges having a hole 13′ in at least the extremities of the ends of the tubular edge whereby to permit securement of the panels between a plurality of hinge members 15. The attachment through bore 25 in the hinge members 15 are also of circular cross-section to receive the tubular edge of the panel members 12. It is within the ambit of the present invention to provide end edges 13 and attachment through bores 25 of cross-sections different than circular as these provide a rigid connection and many shapes can provide a rigid connection. As shown in FIG. 3, the tubular end edge 13 may be formed of a tubular member 30 having an elongated slot 31 along its entire length for connection to a vertical flat edge 33 of the rectangular panel member 12. The edges of the tubular member 30 adjacent the slot 31 may be serrated, as shown at 34, for securing the panel member 12 therein. Also, glue is preferably applied to the end edge of the panel 12 before inserting it into the tubular member 30.

Although not shown in the drawings, it is within the ambit of the present invention to provide reinforcing metallic strands throughout the panel members 12 whereby to provide a stronger curtain.

As shown in FIG. 1, the curtain 10 is supported by the support rods 19 which are preferably located at every second panel member 12 depending, of course, on the width of these panels. If a support rod 19 is not provided in one of the panel members 12, a connecting rod 17 is inserted into the vertical through bore 21 of the panel and held therein by securement means such as the washer and bolt 29 threaded into each end of the connecting rod 17.

The foldable curtain 10 is also secured at its vertical ends by suitable connectors attached to the vertical wall members 40 as is commonly used in the art, see for example, U.S. Pat. No. 3,654,982 issued to the assignee of the present application.

The panel members 12 are preferably constructed of plastic and in the present case, these are extrusion moulded. The panels may be constructed of other suitable materials such as aluminum, wood, steel, etc. Also, the hinge members 15 may be formed of plastic or aluminum material and the same hinge member is provided for connection to either one of opposed end edges of the panel members 12. These hinge members can be formed, for example, by injection moulding. Thus, it can be seen that the curtain of the present invention is relatively light and economical to manufacture and easy to assemble. In its assembled state, it can be seen that the end panels 12 of the curtain wall are secured to the wall members by a cleat section as disclosed in the above-mentioned U.S. patent and not forming part of this invention.

I claim:

1. A foldable closure structure comprising a foldable curtain having a plurality of panel members hingeably interconnected along opposed vertical edges, hinge members secured in spaced apart relationship to each said vertical edges, said hinge members each having panel attachment means for connection to a portion of a respective vertical edge of adjacent panel members, a connecting rod pivotally interconnecting said hinge members of adjacent vertical edges along a common axis, each said hinge member having an abutment surface lying substantially parallel to said connecting rod for abutment with a portion of said vertical edge of said panel member adjacent to the panel member to which said hinge member is connected to, each said hinge member further having a circular bore therein for receiving said connecting rod, said attachment means being a through bore disposed parallel to said circular bore, and a panel receiving opening in said member extending to said through bore for slidingly receiving a portion of said vertical edge of a respective panel member in said through bore, and suspension means for suspending said curtain in a frame opening.

2. A foldable closure as claimed in claim 1 wherein said hinge members are secured in spaced apart relationship along a respective vertical edge of each said panel members, said spacing being equal to the length of said hinge member whereby hinge members from an adjacent panel member may be received in said spacing to permit interconnection of said hinge members of adjacent vertical edges of said panels, along a common axis.

3. A foldable closure as claimed in claim 1 wherein said panel members each comprise a substantially rectangular panel having enlarged elongated vertical edges, said vertical edges being of a cross-section for slideable connection in said attachment through bore of said hinge members with said panel extending out of said panel receiving opening.

4. A foldable closure as claimed in claim 3 wherein said enlarged elongated vertical edges are tubular edges, said through bore of said hinge members having a circular cross-section for receiving said tubular edges, and securement means engageable in the opposed ends of each said tubular members for retaining a plurality of hinge members therebetween.

5. A foldable closure as claimed in claim 4 wherein said tubular edge is formed by a tubular member having an elongated slot along its entire length for connection to the vertical edge of said rectangular panel.

6. A foldable closure as claimed in claim 3 wherein said panel members and said hinge members are made of plastic material.

7. A foldable closure as claimed in claim 1 wherein said panel members are provided with a vertical through bore for receiving a support rod therein, said support rod having a top connectable end secured for sliding displacement in a ceiling track in the top of said opening whereby to permit said plurality of panel members to be folded in accordion fashion below said track.

*8. A foldable closure structure comprising a foldable curtain having a plurality of rigid panel members hingeably interconnected along opposed vertical edges of each panel, at least three hinge members slidingly secured in spaced apart relationship to each of said vertical edges to permit hinge members along a vertical edge of an adjacent panel to be located in close interfitting end-to-end alignment therewith, said hinge members each having panel attachment means extending longitudinally on a side thereof for connection to a portion of a vertical edge of a respective panel member, each said hinge member further having a bore therein for receiving a single elongated connecting rod which is removably securable through said bores of hinge members in interfitting end-to-end alignment to interconnect said hinge members of adjacent panels along a common axis, each hinge member having an abutment surface lying substantially parallel to said connecting rod for direct abutment with a portion of said vertical edge of a panel member on an adjacent side of said hinge member to which said respective panel member is connected to when said foldable closure is in a fully extended condition whereby said elongated connecting rod and said vertical edges of adjacent panels are interlocked in longitudinal abutment with one another, said attachment means being a longitudinal connector disposed parallel to said bore for sliding fit attachment with said portion of said vertical edge of a panel member whereby said vertical edge extends in close contact and parallel to said hinge member.*

* * * * *